United States Patent [19]

Riley

[11] Patent Number: 4,752,158
[45] Date of Patent: Jun. 21, 1988

[54] SWIVEL MOUNTED SLEEVE WITH ADJUSTABLE STAND OFF FOR DEPTH CONTROLLED TOOL

[75] Inventor: Patrick J. Riley, Columbus, Ohio

[73] Assignee: Rockwell International Corporation, Pittsburgh, Pa.

[21] Appl. No.: 803,176

[22] Filed: Dec. 2, 1985

[51] Int. Cl.⁴ .............................................. B23B 47/00
[52] U.S. Cl. .................................. 408/14; 408/72 R; 408/110; 408/241 S
[58] Field of Search .................. 408/14, 15, 72 R, 87, 408/97, 99, 100, 101, 102, 110, 111, 113, 116, 138, 141, 202, 241 S

[56] References Cited

U.S. PATENT DOCUMENTS

| 1,055,013 | 3/1913 | Bennington et al. | 408/202 |
| 1,305,872 | 6/1919 | Bollie | 408/241 |
| 1,362,325 | 12/1920 | Kemna | 408/202 |
| 2,529,988 | 11/1950 | Zempel | 408/203 |
| 2,868,044 | 1/1959 | Chaffee et al. | 408/110 |
| 3,767,313 | 10/1973 | Bohoroquez et al. | 408/14 |
| 3,802,792 | 4/1974 | Quackenbush | 408/130 |
| 4,115,017 | 9/1978 | Wilhelmsson | 408/14 |
| 4,592,257 | 6/1986 | Durr | 408/202 |
| 4,592,681 | 6/1986 | Pennison et al. | 408/102 |
| 4,647,260 | 3/1987 | O'Hara et al. | 408/202 |

FOREIGN PATENT DOCUMENTS 829388 3/1960 United Kingdom ................ 408/102

OTHER PUBLICATIONS

Magnavon Industries brochures for 60121, 60122, 60131 and 60133 series depth control attachments, undated.
United California Corporation 1986 Catalog, pp. 198, 238, 258, 266.

Primary Examiner—Eugene F. Desmond
Assistant Examiner—Daniel W. Howell
Attorney, Agent, or Firm—Quarles & Brady

[57] ABSTRACT

A power tool motor housing rotates a spindle assembly which moves axially within limits of adjusting nuts. A sensing sleeve maintains an axially fixed position with respect to the drive housing and thus with respect to a depth adjustment for controlling axial movement of the spindle. A foot piece moves along the sleeve as an adjusting nut is rotated on the sleeve to adjust stand off without changing preset depth of cut. A swivel assembly connects the sensing sleeve to the power housing so that the power housing may be rotated or indexed without changing the distance between the sensing sleeve and the depth adjustment.

4 Claims, 3 Drawing Sheets

SWIVEL MOUNTED SLEEVE WITH ADJUSTABLE STAND OFF FOR DEPTH CONTROLLED TOOL

The U.S. Government has a paid-up license in this invention and the right in limited circumstances to require the patent owner to license others on reasonable terms as provided for by the terms of Contract No. F33657-81-C-0210 awarded by the U.S. Air Force.

BACKGROUND OF THE INVENTION

Controlling depth of tool movements, for example drilling and countersinking, is a well known process. Many products are available for depth control.

The problem of controlling the depths of tool movement is compounded when using angle power units in small spaces and when depth control must be achieved in a difficult to reach surface while the equipment is supported on a different surface or part.

It is highly desirable that a machine be easily adjusted and once adjusted retain its depth of cut adjustment irrespective of angular position of the power unit or set off from a different surface.

The present invention solves these difficult problems.

SUMMARY OF THE INVENTION

A power tool motor housing rotates a spindle assembly which moves axially within limits of adjusting nuts. A sensing sleeve maintains an axially fixed position with respect to the drive housing and thus with respect to controlled axial movement of the spindle. A foot piece moves along the sleeve as an adjusting nut is rotated on the sleeve to adjust stand off without changing preset depth of cut. A swivel assembly connects the sensing sleeve to the power housing so that the power housing may be rotated or indexed without changing the distance between the sensing sleeve and the depth adjustment.

The preferred adjustable stand off apparatus for right angle power tools with depth control has a sensing sleeve, connection means for connecting the sensing sleeve to driving means, and a foot piece surrounding the sleeve and slidably mounted on the sleeve. Radially extending pin means and slot means interconnect the foot piece and the sleeve to prevent relative rotation. An adjusting thread interconnecting the adjusting nut and the foot piece moves the foot piece axially along the sleeve, with the pin sliding in the slot, for moving the foot piece toward and away from the power means while maintaining the sensing sleeve in fixed position relative to the power means.

The preferred connection means is a swivel having a first portion connected to the power means and having a second portion connected to the sensing sleeve, for permitting relative rotation between the power means and sensing sleeve without changing relative axial position of the sensing sleeve and the power means.

The preferred swivel means includes a swivel adaptor plug threadably connected to the power means. A swivel adaptor base is connected to the sensing sleeve. A swivel adaptor lock nut is threadably connected to the swivel adaptor base and is connected to the swivel adaptor plug for relative rotation thereon. The swivel adaptor lock nut, the swivel adaptor base, the sensing sleeve, the foot piece and the adjusting nut rotate with respect to the swivel adaptor plug and the power means without changing axial position of the sensing sleeve and power means.

A pin extends radially through the swivel adaptor lock nut and the swivel adaptor base for preventing relative rotation.

One swivel has a swivel adaptor plug threaded on the power means and a bearing cap rotatably connected to the swivel plug and threaded on the sensing sleeve.

The preferred sensing sleeve is an axially elongated sleeve having an axially extending slot therein for cooperating with a pin fixed in the foot piece for limiting travel of the foot piece with respect to the sensing sleeve.

Preferably, the sensing sleeve has an outward extending flange adjacent an upper end thereof and the adjusting nut has an inward extending collar for overlying the flange. The sleeve has an outward extended portion with internal threads at its upper end for connection to the swivel.

A spindle assembly is mounted in the power means for turning by the power means and for relative up and down movement with respect to the sensing sleeve. A depth control nut connected to the spindle assembly controls axial movement of the spindle assembly with respect to the sensing sleeve.

Preferably the spindle assembly extends from the power means remote from the sensing sleeve. The depth control nut is mounted on the spindle assembly remote from the sensing sleeve.

The preferred method of adjusting stand off comprises sliding a stand off foot piece axially along a sensing sleeve and sliding threads on the adjusting nut along threads on the foot piece while the sensing sleeve is axially fixed with respect to a power tool.

These and other and further objects and features of the invention are apparent in the disclosure which includes the above and ongoing specification and claims and drawings.

DETAILED DESCRIPTION OF THE DRAWINGS

Figure 1:
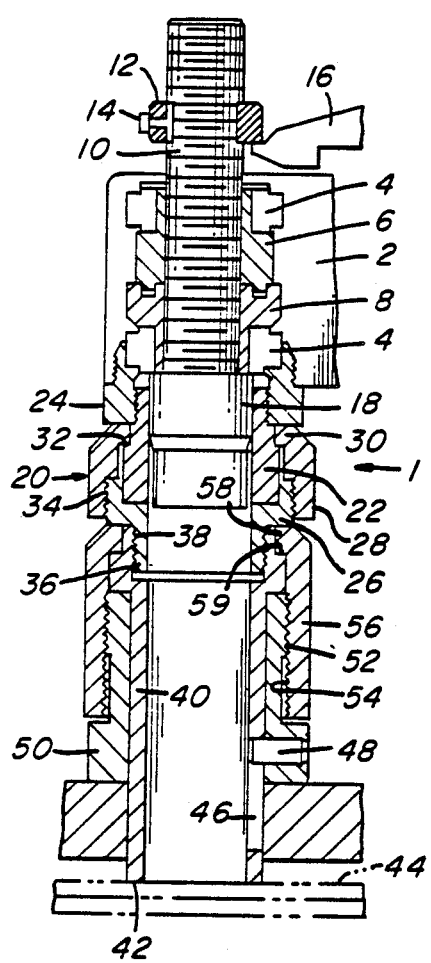
FIG. 1 is an assembly drawing, partly in section, showing elements of the invention.

The apparatus of the present invention is generally indicated by the numeral 1. A housing 2, enclosing drive members of a right angle power tool, is broken away for clarity to omit the showing of a power drive motor. Bearings 4 support rotating elements 6 and 8, which turn the spindle IO. A depth control adjusting nut 12 is adjusted to a precise position on the spindle and is locked in place by a plurality of set screws 14. A conventional dog 16 contacts the depth adjusting nut 12. A bearing collar 18 on the spindle 10 cooperates with bearings 4 to hold the spindle 10 and the tool connected to the spindle aligned in the apparatus.

A swivel 20 is connected to the power drive housing 2. The swivel includes a swivel adaptor plug 22 with a smooth internal bearing surface. The swivel adaptor plug is threaded to the bearing retainer 24 at the bottom of the power tool drive housing 2. Swivel adaptor base 26 has an internal smooth surface which rotates on an external surface of swivel adaptor plug 22. Swivel adaptor lock nut 28 has a collar 30 which fits over a radially extending flange 32 on adaptor plug 22. Screw threads 34 connect the lock nut 28 and the adaptor base 26 to axially hold the swivel elements 2 together.

Figure 18:
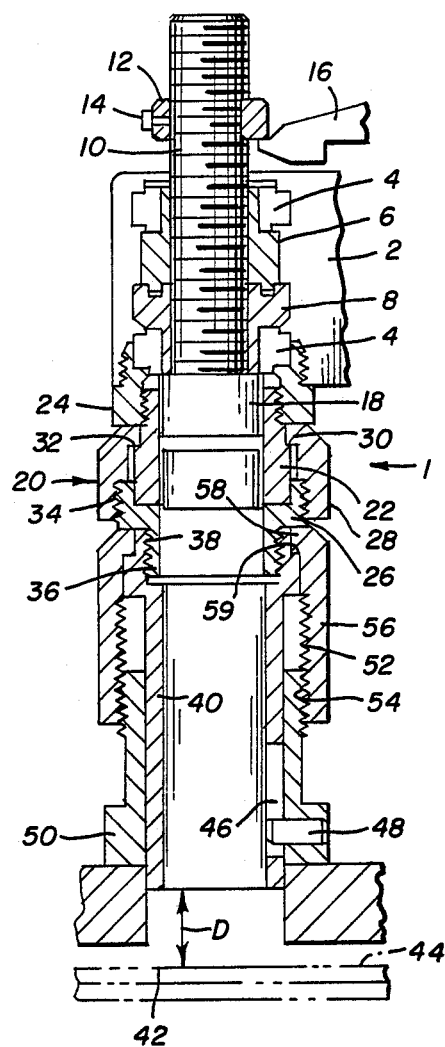
FIG. 18 is a view like FIG. 1 but with the assembly adjusted to stand off from the work piece by a distance D.

Swivel adaptor base 26 has external threads 36 which cooperate with internal threads 38 at an upper portion of sleev 40 to hold the sleeve attached to the swivel 20 so that a nut 56 may turn with respect to the sleeve and swivel. A remote end 42 of the sensing sleeve 40 contacts the work piece 44 in FIG. 1 and is shown adjusted to stand off from the work piece 44 by a distance D in FIG. 18. Footpiece 50 has a forward face which rests upon a drill plate. Stand off is the distance from the top of the drill plate on which the footpiece rests to the forward end of the sensing sleeve. A slot 46 receives a pin 48 which is mounted in foot piece 50. Foot piece 50 has external adjusting threads 52 which cooperate with internal adjusting threads 54 on adjusting nut 56 to slide the foot piece 50 along sleeve 40. Collar 58 on nut 56 overlies flange 59 on sleeve 40 to hold the nut in position between flange 59 and adaptor base 26. The swivel 20 permits the power unit 2 to be rotated to any position without disturbing the relative position of the depth controlling nut 12 and the sensing sleeve 40, and without changing the relative position of the foot piece 50 and the sensing sleeve 40.

Figure 3:
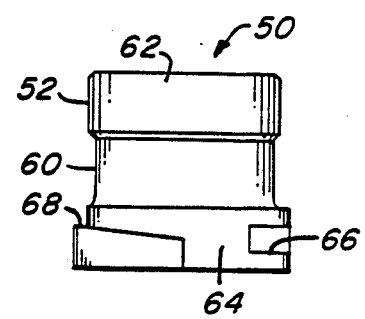
FIG. 3 is a detail of the foot piece.
Figure 5:
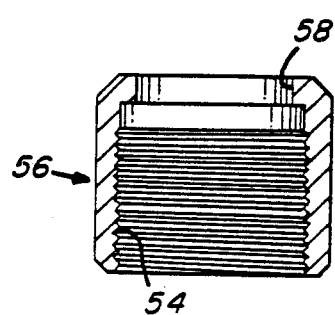
FIG. 5 is a detail of the adjusting nut.
Figure 4:
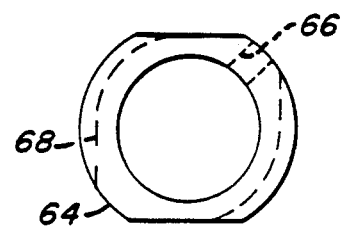
FIG. 4 is an end view of the foot piece.

As shown in FIG. 3, the foot piece 50 has a central section 60 and an upset end 62 on which the threads 52 are formed. An upset end 64 has a radial opening 66 for receiving a press fit dowel. A ramp 68 is provided on upset end 64 for cooperating with structural abutments.

Figure 6:
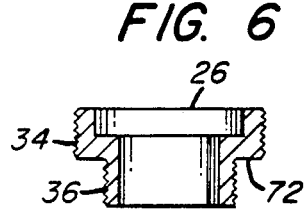
FIG. 6 is a detail of a swivel adaptor base.
Figure 7:
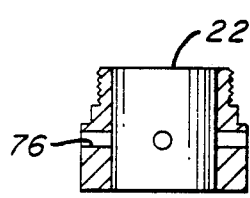
FIG. 7 is a detail of a swivel adaptor plug.
Figure 8:
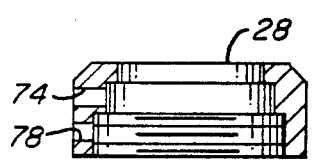
FIG. 8 is a detail of a swivel adaptor lock nut.

The swivel adaptor base 26 is shown in FIG. 6. The base has a step 72 which captures the adjusting nut collar 58. External threads 36 hold the sleeve in fixed position and larger diameter external threads 34 receive complementary threads on the swivel adaptor lock nut 28 shown in FIG. 8. Plural radial holes 74 in the lock nut and 76 in swivel adaptor plug 22, shown in FIgure 7, cooperate to receive pins screwed in holes 74 to hold the power unit 2 in a selected indexed position. Removal of the screws from holes 74 and 76 permits indexing of the power unit 2 with respect to the sensor sleeve 40 and foot piece 50. Plural holes 78 receive a spanner wrench for tightening nut 28.

Figure 10:
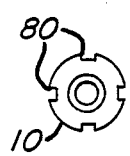
FIG. 10 is an upper end view of the spindle shown in FIG. 9.
Figure 11:
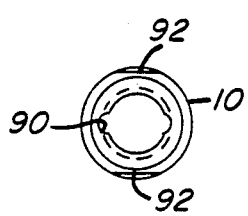
FIG. 11 is a lower end view of the spindle shown in FIG. 9.
Figure 12:
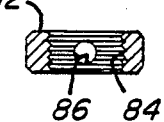
FIG. 12 is a detail of a depth control nut.
Figure 9:
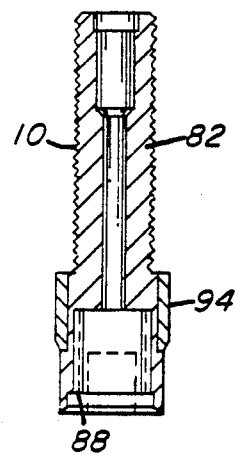
FIG. 9 is a detail of a spindle.
Figure 14:
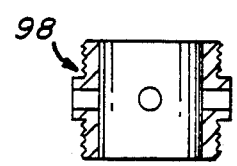
FIG. 14 is a detail of an alternate adaptor.

As shown in FIGS. 9, 10 and 11, spindle 10 has elongated keyways 80 which cooperate with keys on the power unit which turn the spindle. The spindle shaft B2 is threaded to receive threads 84 of depth control nut 12, as shown in FIG. 12. Threaded radial holes 86 in the depth control nut 12 receive the locking set screws 14. Chuck receiving end 88 is threaded to receive a tool holding chuck. Radial groove 90 and wrench flats 92 are provided on the spindle 10 to assist in the mounting of a tool or chuck. Bearing 94 on spindle 10 moves along the smooth internal surfaces of the swivel adaptor plug 22, the swivel adaptor base 26 and sensing sleeve 40.

Figure 13:
FIG. 13 is a detail of a retract stop nut.

Retract stop nuts 96, as shown in FIG. 13, may also be screwed on threads of the spindle 10 to control the amount of retraction of the spindle.

Figure 15:
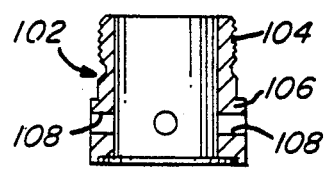
FIG. 15 is a detail of an alternate swivel plug.

An adaptor 98, as shown in FIG. 15, may replace the swivel assembly 20 shown in FIG. 1.

Figure 2:
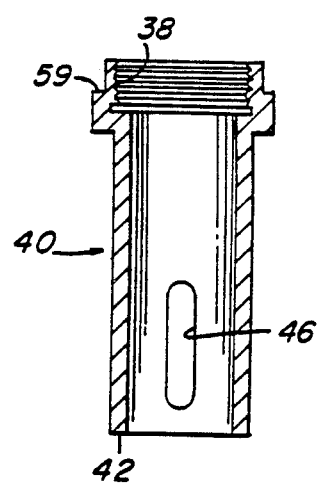
FIG. 2 is a detail of the sleeve.
Figure 16:
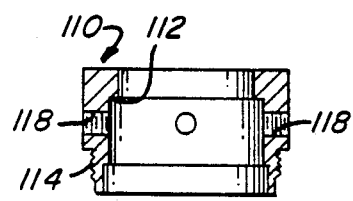
FIG. 16 is a detail of a bearing cap.
Figure 17:
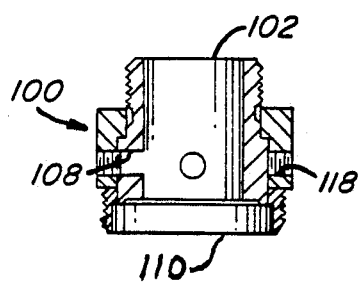
FIG. 17 is an assembly of the swivel plug and bearing cap of FIGS. 15 and 16.

An alternate swivel assembly 100, as shown in FIG. 17, may also replace swivel assembly 20, as shown in FIG. 1. Alternate swivel assembly 100 is comprised of a swivel plug 102 and bearing cap 110 as shown in FIGS. 15 and 16, respectively. Swivel plug 102 has threads 104 which cooperate with threads in the retaining nut 24 shown in FIG. 1. Upset end 106 has holes 108 which receive index locking screws provided to holes 118 of bearing cap 110 as shown in FIG. 16. Lugs 112 rest upon upset end 106 of the swivel plug 102, thereby permitting rotation to align holes 118 and 102 before inserting the locking screws. Threads 114 cooperate with threads 38 on the sleeve 40 as shown in FIG. 2.

While the invention has been described with reference to specific embodiments, modifications and variations of the invention may be constructed without departing from the scope of the invention. The scope of the invention is defined in the following claims.

I claim:

1. An adjustable stand off apparatus for a right angle power tool with depth control comprising: a sensing sleeve, connection means for connecting the sensing sleeve to power means, a foot piece surrounding the sleeve and slidably mounted on the sleeve, radially extending pin means and slot means interconnecting the foot piece and the sleeve to prevent relative rotation, an adjusting nut mounted on the sleeve for rotating thereon, and adjusting thread means interconnecting the adjusting nut and the foot piece for moving the foot piece axially along the sleeve with the pin sliding in the slot for moving the foot piece toward and away from the power means while maintaining the sensing sleeve in fixed axial position relative to the power means, wherein the connection means further comprises swivel means having a first portion connected to the power means and having a second portion connected to the sensing sleeve means for permitting relative rotation between the power means and sensing sleeve means without changing the relative axial position of the sensing sleeve means and the power means, and wherein the swivel means comprises a swivel adaptor plug threadedly connected to the power means, a swivel adaptor base connected to the sensing sleeve, and a swivel adaptor lock nut threadably connected to the swivel adaptor base and connected to the swivel adaptor plug for relative rotation thereon thus permitting the swivel adaptor lock nut, the swivel adaptor base, the sensing sleeve, the foot piece and the adjusting nut to rotate with respect to the swivel adaptor plug and to the power means without changing axial position of the sensing sleeve and power means.

2. The apparatus of claim 1 wherein the swivel means further comprises pin means extending radially through the swivel adaptor lock nut and the swivel adaptor base for preventing relative rotation.

3. An adjustable stand off apparatus for a right angle power tool with depth control comprising: a sensing sleeve, connection means for connecting the sensing sleeve to power means, a foot piece surrounding the sleeve and slidably mounted on the sleeve, radially extending pin means and slot means interconnecting the foot piece and the sleeve to prevent relative rotation, an adjusting nut mounted on the sleeve for rotating thereon, and adjusting thread means interconnecting the adjusting nut and the foot piece for moving the foot piece axially along the sleeve with the pin sliding in the slot for moving the foot piece toward and away from the power means while maintaining the sensing sleeve in fixed axial position relative to the power means, wherein the connection means further comprises swivel means having a first portion connected to the power means and having a second portion connected to the sensing sleeve means for permitting relative rotation between the power means and sensing sleeve means without changing the relative axial position of the sensing sleeve means and the power means, and wherein the swivel means comprises a swivel adaptor plug threadably connected to the power means and a bearing cap rotatably connected to the swivel plug and threadably connected to the sensing sleeve.

4. An adjustable stand off apparatus for a right angle power tool with depth control comprising: a sensing sleeve, connection means for connecting the sensing sleeve to power means, a foot piece surrounding the sleeve and slidably mounted on the sleeve, radially extending pin means and slot means interconnecting the foot piece and the sleeve to prevent relative rotation, an adjusting nut mounted on the sleeve for rotating thereon, and adjusting thread means interconnecting the adjusting nut and the foot piece for moving the foot piece axially along the sleeve with the pin sliding in the slot for moving the foot piece toward and away from the power means while maintaining the sensing sleeve in fixed axial position relative to the power means, wherein the sensing sleeve comprises an axially elongated sleeve having an axially extending slot therein for cooperating with pin means fixed in the foot piece fot limiting travel of the foot piece with respect to the sensing sleeve and wherein the sensing sleeve has an outward extending flange adjacent an upper end thereof and wherein the adjusting nut has an inward extending collar for overlying the flange and wherein the sleeve has an outward extended portion with internal threads at its upper end for connection to the connecting means.

* * * * *